United States Patent
Zhang et al.

(10) Patent No.: US 11,258,576 B2
(45) Date of Patent: Feb. 22, 2022

(54) METHOD, DEVICE, TRANSMITTER, AND RECEIVER FOR DETECTING SYNCWORDS

(71) Applicant: HARBIN HYTERA TECHNOLOGY CORP., LTD., Harbin (CN)

(72) Inventors: Jiangong Zhang, Harbin (CN); Hongtao Yu, Harbin (CN); Hong Sun, Harbin (CN)

(73) Assignee: HARBIN HYTERA TECHNOLOGY CORP., LTD., Harbin (CN)

( * ) Notice: Subject to any disclaimer, the term of this patent is extended or adjusted under 35 U.S.C. 154(b) by 186 days.

(21) Appl. No.: 16/615,407

(22) PCT Filed: May 26, 2017

(86) PCT No.: PCT/CN2017/086053
§ 371 (c)(1),
(2) Date: Nov. 21, 2019

(87) PCT Pub. No.: WO2018/214138
PCT Pub. Date: Nov. 29, 2018

(65) Prior Publication Data
US 2021/0281388 A1    Sep. 9, 2021

(51) Int. Cl.
*H04L 7/00* (2006.01)
*H04L 1/00* (2006.01)
*H04L 7/10* (2006.01)

(52) U.S. Cl.
CPC .......... *H04L 7/0091* (2013.01); *H04L 1/0033* (2013.01); *H04L 1/0036* (2013.01); *H04L 7/10* (2013.01)

(58) Field of Classification Search
CPC ....... H04L 7/0008; H04L 7/02; H04L 7/0012; H04B 1/7156; H04B 1/715

(Continued)

(56) References Cited

U.S. PATENT DOCUMENTS 6,975,582 B1 * 12/2005 Karabinis .......... H04B 7/18563
370/204
8,559,481 B2   10/2013 Sapozhnykov et al.
(Continued)

FOREIGN PATENT DOCUMENTS

CN      103346977 A     10/2013
CN      105376850 A      3/2016
CN      106992834 A      7/2017

OTHER PUBLICATIONS

International Search Report dated Mar. 2, 2018 in the corresponding international application(application No. PCT/CN2017/086053).

*Primary Examiner* — Khai Tran
(74) *Attorney, Agent, or Firm* — Kilpatrick Townsend & Stockton, LLP

(57) ABSTRACT

The present application provides a method, a device, a transmitter, and a receiver for detecting syncwords. After inserting syncwords in a data frame to be transmitted, a transmitter transmits the data frame to be transmitted inserted with a preset number of syncwords to a receiver. Because the bit-length of information in the data frame to be transmitted inserted with the preset number of syncwords is a specified multiple of the length of the syncwords, and the symbol components of the preset number of the inserted syncwords are different, or the symbol components are the same but the orders of the symbols are different, the receiver correlates each syncword of the preset number of syncwords with the data frame to be transmitted inserted with the preset number of syncwords after receiving the data frame to be transmitted.

10 Claims, 24 Drawing Sheets

(58) Field of Classification Search
USPC ......................................................... 375/354
See application file for complete search history.

(56) References Cited

U.S. PATENT DOCUMENTS

| | | | | |
|---|---|---|---|---|
| 2006/0002453 | A1* | 1/2006 | Song | H04B 1/7095 |
| | | | | 375/145 |
| 2008/0270143 | A1* | 10/2008 | Metz | G10L 19/167 |
| | | | | 704/500 |
| 2014/0093022 | A1* | 4/2014 | Shi | H04L 41/0896 |
| | | | | 375/358 |
| 2020/0235777 | A1* | 7/2020 | Zhang | H04B 1/715 |

* cited by examiner

METHOD, DEVICE, TRANSMITTER, AND RECEIVER FOR DETECTING SYNCWORDS

CROSS-REFERENCE TO RELATED APPLICATIONS

The present application is a U.S. national phase of International Application No. PCT/CN2017/086053, titled "METHOD, DEVICE, TRANSMITTER, AND RECEIVER FOR DETECTING SYNCWORDS", filed on May 26, 2017, the disclosure of which is incorporated herein by reference in its entirety.

TECHNICAL FIELD

The present disclosure relates to the field of communications, and in particular to a method and device for detecting a syncword, a transmitter, and a receiver.

BACKGROUND

Data transmission refers to sending and receiving data in a certain data frame format. When a data transmission distance is long, in order to save link resources, frame alignment information of data from a transmitter is not sent to a receiver via a dedicated link. A commonly used method is to insert a syncword at intervals into data to be transmitted. After receiving the data, the receiver determines the frame alignment information of the data by means of detecting the syncword.

Syncword detection refers to that the receiver recognizes the data sent by the transmitter, extracts syncword information from the data, and determines the frame alignment information of the data, that is, a start position and an end position of a data frame, thereby completing an entire data alignment process.

In the conventional technology, a single syncword is usually inserted in transmitted data. A correlation peak may appear in a process of detecting the syncword, while the correlation peak is easily interfered and may not be detected, which will result in a high frame loss rate.

Therefore, it is needed to provide a method to decrease a frame loss rate during a data transmission process.

SUMMARY

In view of the above, a method and device for detecting a syncword, a transmitter and a receiver are provided according to the present disclosure, to solve the problem of a high frame loss rate during a data transmission process.

To solve the above technical problem, the following technical solutions are provided according to the present disclosure.

A method for detecting a syncword applied to a transmitter includes:
inserting a preset number of syncwords into a data frame to be sent, where a length of an information field in the data frame to be sent inserted with the preset number of syncwords is a specified number times a length of the syncword, and the preset number of syncwords have different compositions of symbols or are composed of same symbols but with orders of the symbols being different from each other; and
sending the data frame to be sent inserted with the preset number of syncwords to a receiver.

In one embodiment, after sending the data frame to be sent inserted with the preset number of syncwords to the receiver, the method further includes:
receiving a handshake signal from the receiver;
adjusting, according to a preset rule, a position of at least one syncword of the preset number of syncwords inserted in a next data frame, where the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent; and
sending the next data frame to the receiver, where the position of the at least one syncword of the preset number of syncwords inserted in the next data frame is adjusted.

In one embodiment, positions of the preset number of syncwords in the data frame to be sent are arranged evenly; or
the positions of the preset number of syncwords in the data frame to be sent are arranged unevenly.

In one embodiment, the length of the information field in the data frame to be sent inserted with the preset number of syncwords is two times the length of the syncword.

In one embodiment, the preset number is three.

A method for detecting a syncword applied to a receiver includes:
receiving a data frame to be sent inserted with a preset number of syncwords from a transmitter; and
performing a cross-correlation process between each syncword of the preset number of syncwords and the data frame to be sent inserted with the preset number of syncwords.

In one embodiment, after performing the cross-correlation process between each syncword of the preset number of syncwords and the data frame to be sent inserted with the preset number of syncwords, the method further includes:
determining whether at least two syncwords in the data frame to be sent inserted with the preset number of syncwords are not detected;
sending a handshake signal to the transmitter in a case that it is determined at least two syncwords in the data frame to be sent inserted with the preset number of syncwords are not detected; and
receiving, from the transmitter, a next data frame inserted with the preset number of syncwords, where a position of at least one syncword of the preset number of syncwords inserted in the next data frame is adjusted.

A device for detecting a syncword applied to a transmitter includes:
an insertion unit, configured to insert a preset number of syncwords into a data frame to be sent, where a length of an information field in the data frame to be sent inserted with the preset number of syncwords is a specified number times a length of the syncword, and the preset number of syncwords have different compositions of symbols or are composed of same symbols but with orders of the symbols being different from each other; and
a sending unit, configured to send the data frame inserted with the preset number of syncwords to a receiver.

In one embodiment, the device further includes:
a handshake signal receiving unit, configured to receive a handshake signal from the receiver after the sending unit sends the data frame to be sent inserted with the preset number of syncwords to the receiver; and
an adjusting unit, configured to adjust, according to a preset rule, a position of at least one syncword of the preset number of syncwords inserted in a next data frame, where the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent, where the sending unit is further configured to send the next data frame to the receiver, where the position of the at least one syncword of the preset number of syncwords inserted in the next data frame is adjusted.

A device for detecting a syncword applied to a receiver includes a receiving unit, configured to receive a data frame to be sent inserted with a preset number of syncwords from a transmitter; and a cross-correlation unit, configured to perform a cross-correlation process between each syncword of the preset number of syncwords and the data frame to be sent inserted with the preset number of syncwords.

In one embodiment, the device further includes:

a determination unit, configured to determine, after the cross-correlation unit performs the cross-correlation process between each syncword of the preset number of syncwords and the data frame to be sent inserted with the preset number of syncwords, whether at least two syncwords in the data frame to be sent inserted with the preset number of syncwords are not detected; and a handshake signal sending unit, configured to send a handshake signal to the transmitter in a case that the determination unit determines at least two syncwords in the data frame to be sent inserted with the preset number of syncwords are not detected, where the receiving unit is further configured to receive, from the transmitter, a next data frame inserted with the preset number of syncwords, where a position of at least one syncword of the preset number of syncwords inserted in the next data frame is adjusted.

A transmitter includes a memory and a processor, where the memory is configured to store a program, and the processor is configured to call the program to:

insert a preset number of syncwords into a data frame to be sent, where a length of an information field in the data frame to be sent inserted with the preset number of syncwords is a specified number times a length of the syncword, and the preset number of syncwords have different compositions of symbols or are composed of same symbols but with orders of the symbols being different from each other; and send the data frame inserted with the preset number of syncwords to a receiver.

In one embodiment, after sending the data frame inserted with the preset number of syncwords to the receiver, the processor is further configured to:

receive a handshake signal from the receiver;

adjust, according to a preset rule, a position of at least one syncword of the preset number of syncwords inserted in a next data frame, where the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent; and send the next data frame to the receiver, where the position of the at least one syncword of the preset number of syncwords inserted in the next data frame is adjusted.

A receiver includes a memory and a processor, where the memory is configured to store a program, and the processor is configured to call the program to:

receive a data frame to be sent inserted with a preset number of syncwords from a transmitter; and perform a cross-correlation process between each syncword of the preset number of syncwords and the data frame to be sent inserted with the preset number of syncwords.

In one embodiment, after performing the cross-correlation process between each syncword of the preset number of syncwords and the data frame to be sent inserted with the preset number of syncwords, the processor is further configured to:

determine whether at least two syncwords in the data frame to be sent inserted with the preset number of syncwords are not detected;

send a handshake signal to the transmitter in a case that it is determined at least two syncwords in the data frame to be sent inserted with the preset number of syncwords are not detected; and receive, from the transmitter, a next data frame inserted with the preset number of syncwords, where a position of at least one syncword of the preset number of syncwords inserted in the next data frame is adjusted.

Compared with the conventional technology, the technical solutions of the present disclosure have technical effect as follows.

The present disclosure provides a method for detecting a syncword, a transmitter and a receiver. After inserting a preset number of syncwords into a data frame to be sent, the transmitter sends the data frame to be sent inserted with the preset number of syncwords to the receiver. As a length of an information field in the data frame to be sent inserted with the preset number of syncwords is a specified number times a length of the syncword and the inserted preset number of syncwords have different compositions of symbols or are composed of same symbols but with orders of the symbols being different from each other, the receiver, after receiving the data frame to be sent, performs a cross-correlation process between each syncword of the preset number of syncwords and the data frame to be sent inserted with the preset number of syncwords. In this way, it is ensured that at least one syncword can be detected, so that the position of at least one syncword can be determined, thereby identifying frame alignment information of data and reducing the frame loss rate.

BRIEF DESCRIPTION OF THE DRAWINGS

In order to explain more clearly the technical solutions according to the embodiments of the present disclosure or in the conventional art, the accompanying drawings used in description of the embodiments or the conventional art are briefly introduced hereinafter. Apparently, the drawings described below are only some embodiments of the present disclosure, and for those skilled in the art, other drawings can also be obtained from these drawings without any creative effort.

DETAILED DESCRIPTION OF THE EMBODIMENTS

Following is a clear and complete description of the technical solutions of the present disclosure with reference to the accompanying drawings in the present disclosure. Apparently, the described embodiments are only some rather than all of the embodiments of the present disclosure. Based on the embodiments of the present disclosure, all other embodiments obtained by the skilled in the art without any creative effort fall within the scope of the present disclosure.

A method for detecting a syncword applied to a transmitter is provided according to an embodiment of the present disclosure. The transmitter refers to a terminal for sending data, and the data is sent in a format of data frame by the transmitter.

Figure 1:
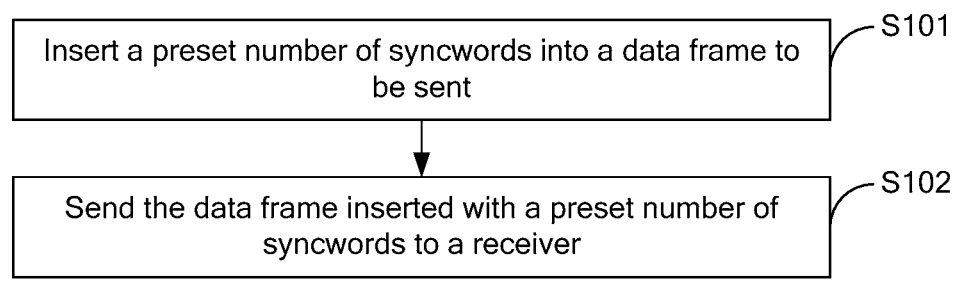
FIG. 1 is a schematic diagram of a method for detecting a syncword applied to a transmitter according to an embodiment of the present disclosure.

Referring to FIG. 1, the method for detecting a syncword includes steps S101 and S102 in the following.

In step S101, a preset number of syncwords are inserted into a data frame to be sent.

The preset number is determined by negotiation between a data transmitter and a data receiver. In one embodiment, the preset number is three, and in addition, the preset number may also be two, four, five or more, etc.

In one embodiment, the preset number is set to be three. Compared to setting two, four, five or more syncwords, it is easier to detect a syncword by setting three syncwords, because a peak value of each syncword will be small and it is not easy to detect if four or more syncwords are set.

A length of an information field in the data frame to be sent inserted with the preset number of syncwords is a specified number times a length of the syncword. In an embodiment, the length of the information field in the data frame to be sent inserted with the preset number of syncwords is two times the length of the syncword.

The preset number of syncwords has different compositions of symbols or are composed of same symbols but with orders of the symbols being different, to ensure that the syncwords are different from each other.

It should be noted that the positions of the preset number of syncwords in the data frame to be sent are arranged evenly; or the positions of the preset number of syncwords in the data frame to be sent are arranged unevenly.

In order for a person skilled in the art to more clearly understand the positions of the preset number of syncwords inserted in the data frame to be sent, a description will be given with reference to FIGS. 2a to 2j. An information field includes data to be outputted. A protection field includes data used for protecting data security and includes a redundant field. It should be noted that, three syncwords are taken as an example for description in this embodiment.

Figure 2A:
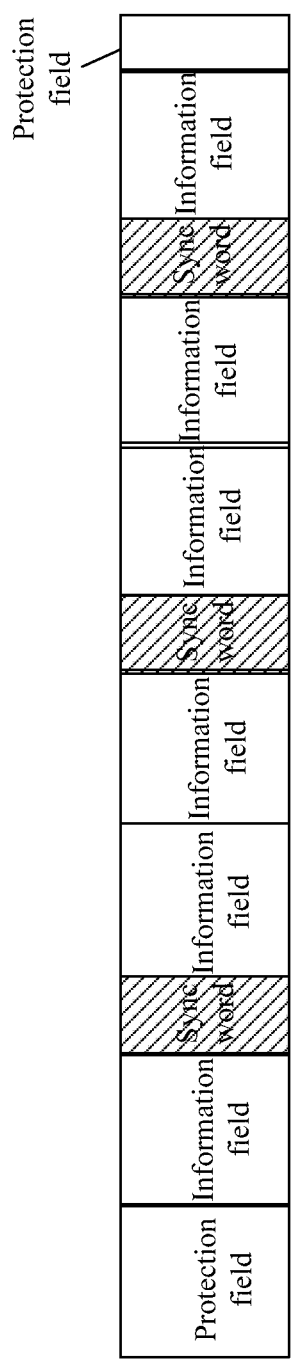
FIG. 2a is a schematic diagram of a first data frame structure.
Figure 2B:
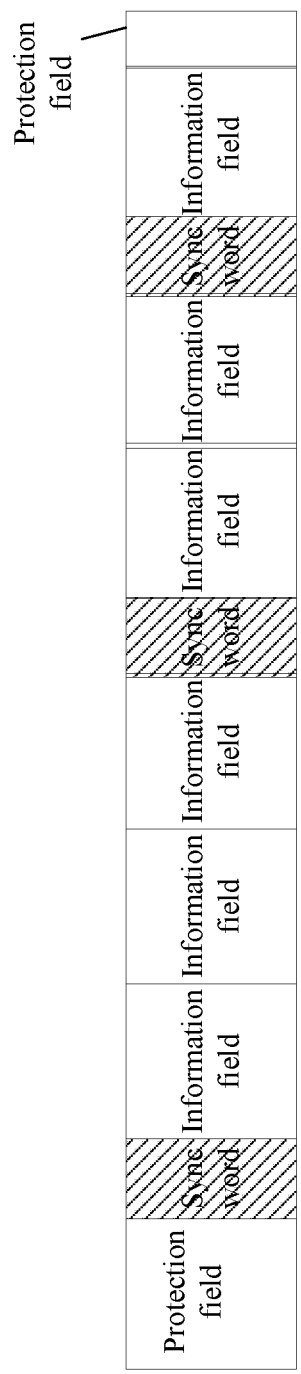
FIG. 2b is a schematic diagram of a second data frame structure.
Figure 2C:
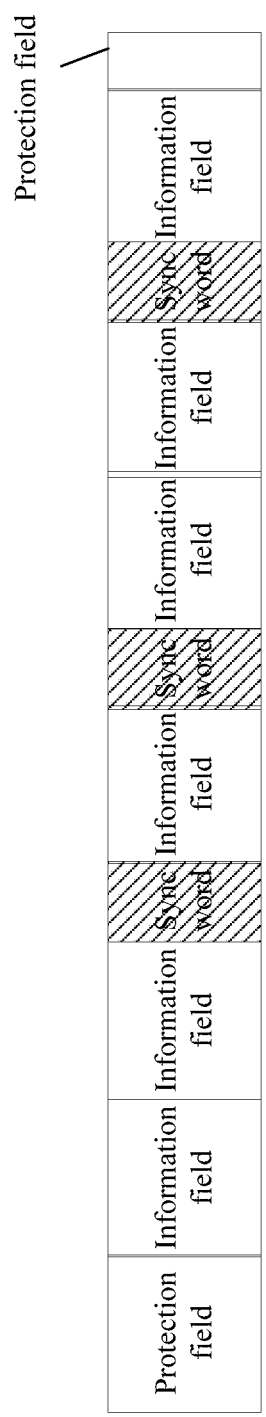
FIG. 2c is a schematic diagram of a third data frame structure.
Figure 2D:
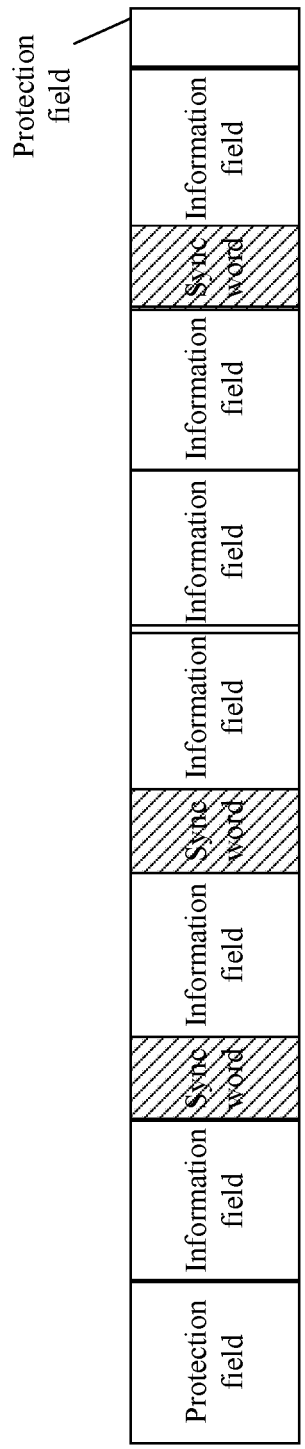
FIG. 2d is a schematic diagram of a fourth data frame structure.
Figure 2E:
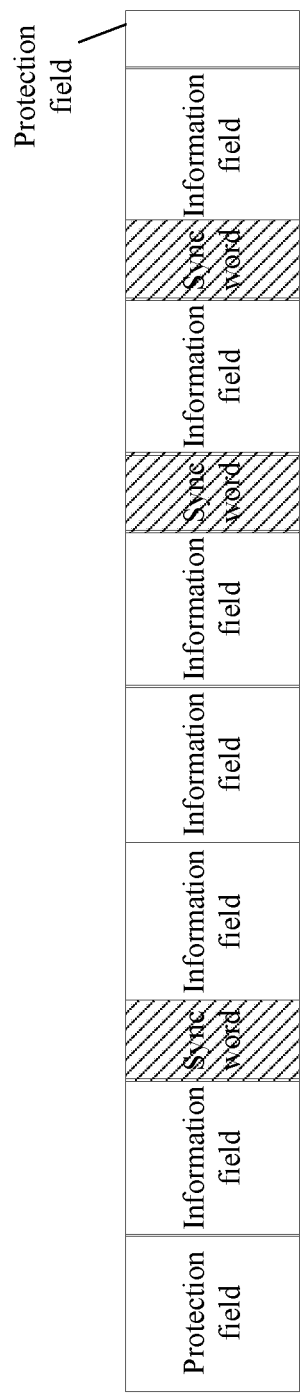
FIG. 2e is a schematic diagram of a fifth data frame structure.
Figure 2F:
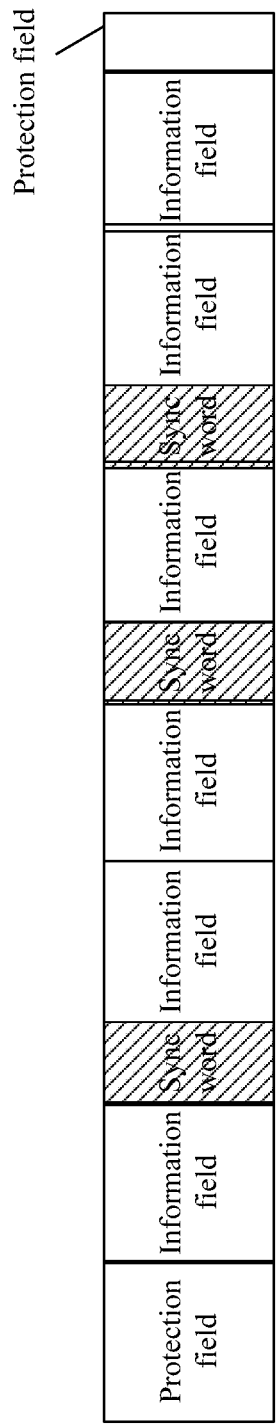
FIG. 2f is a schematic diagram of a sixth data frame structure.
Figure 2G:
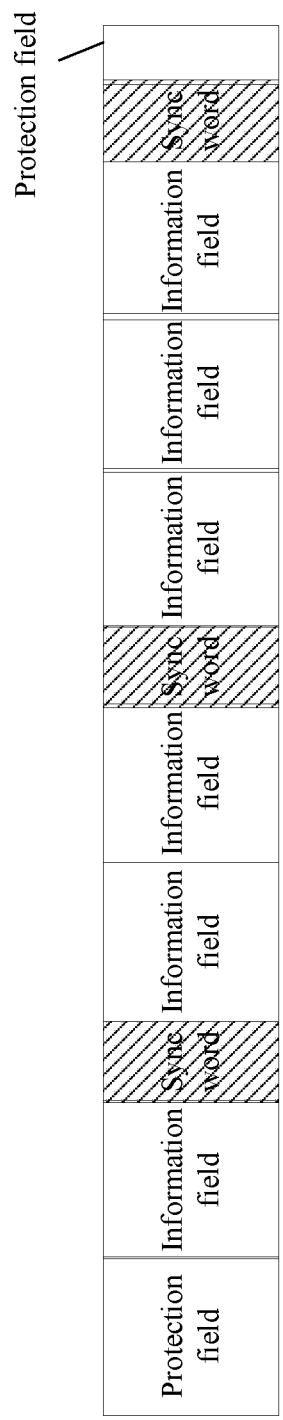
FIG. 2g is a schematic diagram of a seventh data frame structure.

Three syncwords in FIG. 2a are evenly distributed in the data frame to be sent inserted with the three syncwords. Two information fields are arranged between each two syncwords. FIG. 2b illustrates a case where a first syncword in FIG. 2a is moved to the left for a distance. FIG. 2c illustrates a case where the first syncword in FIG. 2a is moved to the right for a distance. FIG. 2d illustrates a case where a second syncword in FIG. 2a is moved to the left for a distance. FIG. 2e illustrates a case where the second syncword in FIG. 2a is moved to the right for a distance. FIG. 2f illustrates a case where a third syncword in FIG. 2a is moved to the left for a distance. FIG. 2g illustrates a case where a third syncword in FIG. 2a is moved to the right for a distance. The moving distance of the syncword in FIGS. 2b to 2g is ⅙ of a data length of all information fields.

Figure 2H:
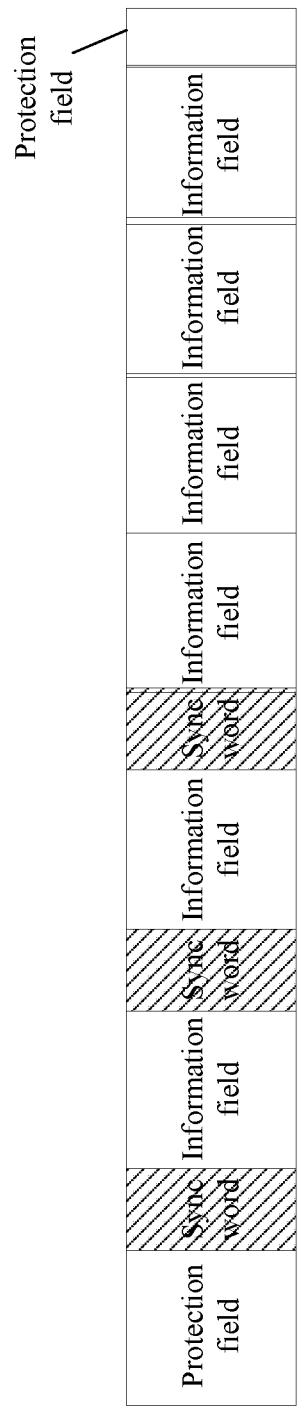
FIG. 2h is a schematic diagram of an eighth data frame structure.
Figure 2I:
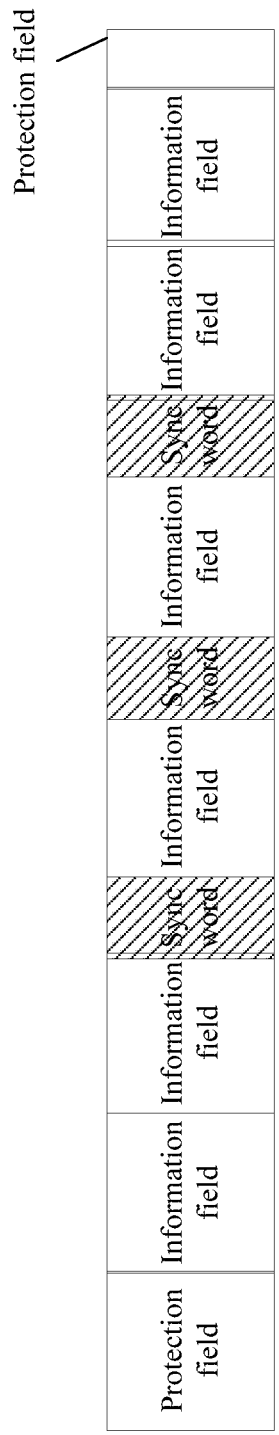
FIG. 2i is a schematic diagram of a ninth data frame structure.
Figure 2J:
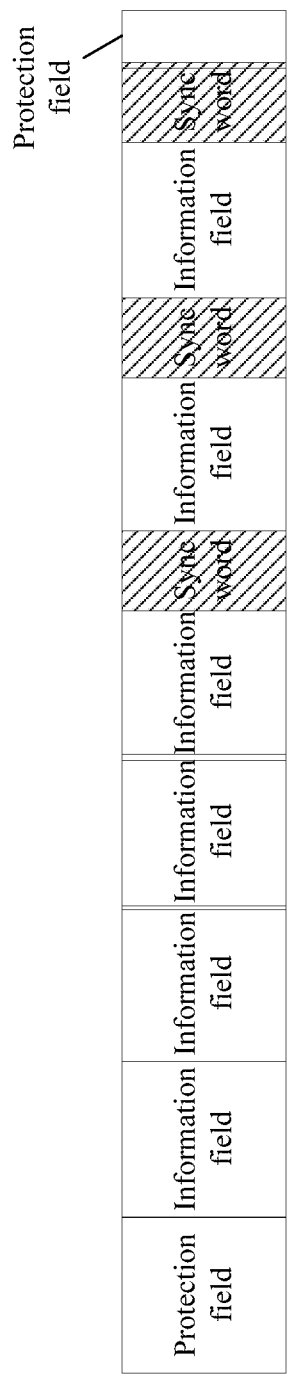
FIG. 2j is a schematic diagram of a tenth data frame structure.

The distribution of the three syncwords in FIGS. 2h to 2j is relatively concentrated. The three syncwords in FIG. 2h are distributed at the head of the information fields, the three syncwords in FIG. 2i are distributed in the middle of the information fields, the three syncwords in FIG. 2j are distributed at the tail of the information fields.

In step S102, the data frame to be sent inserted with the preset number of syncwords is sent to a receiver.

Taking a positional scheme of the three syncwords in FIG. 2a as an example, reference is made to FIGS. 3a to 3e, which illustrate fading results after a cross-correlation process is performed between each of the three syncwords and the data frame to be sent inserted with the three syncwords.

The definition of fading is described as follows. Mobile communications systems are mostly built in an urban area of large and medium cities. Buildings in the city are high, are spaced from each other by various distances and have different shapes, thus, signal transmission characteristics change very sharply. As a result, radio waves received by a mobile station are generally superposition of direct waves and everchanging reflected waves and scattered waves. This phenomenon is called fading.

Many factors in a wireless propagation channel will affect the fading, mainly:

(1) multipath propagation: scattering and reflections in the channel may cause signals to reach a receiving antenna through different paths;

(2) speed of the mobile station: the relative motion between a base station and the mobile station causes different multipath components to generate different Doppler frequency shifts;

(3) speed of surrounding objects;

(4) transmission bandwidth of the signal.

A Rayleigh fading model is used to simulate a real environment in simulation. The Rayleigh fading channel is a statistical model for wireless radio signal propagation environment, and is suitable for wireless channels in urban centers with dense buildings. Due to the dense buildings and other objects, there is no direct path between a transmitter and a receiver of wireless devices, therefore, the wireless signal is attenuated, reflected, refracted, and diffracted.

Figure 3A:
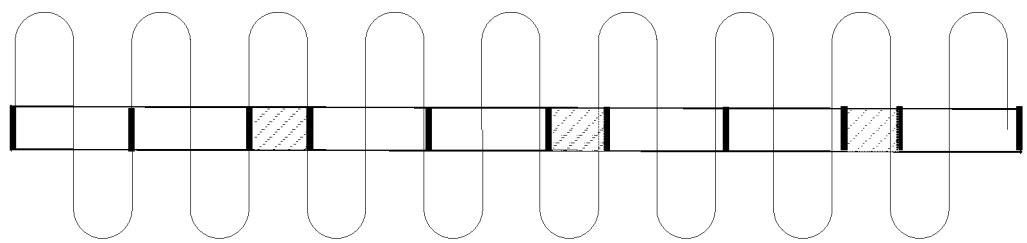
FIG. 3a is a schematic diagram illustrating a first fading result.
Figure 3B:
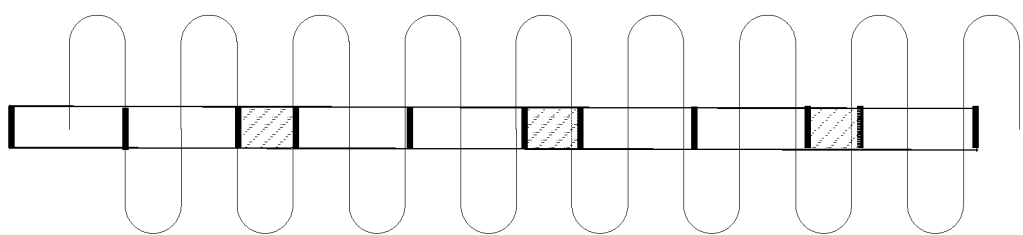
FIG. 3b is a schematic diagram illustrating a second fading result.

In this embodiment, it is assumed that a noise fading period of the Rayleigh fading channel is the same as a length of an information field. Referring to FIGS. 3a and 3b, in FIG. 3a, a shaded portion refers to a position of a syncword, and a concave position of a wavy line refers to a fading position. As can be seen from the figure, the first syncword and the third syncword each are at a convex portion of the wavy line, indicating that fading is avoided, the second syncword is located in the concave portion of the wavy line, indicating that the second syncword is faded. In FIG. 3b, the first syncword and the third syncword are faded, while the second syncword avoids fading.

Figure 3C:
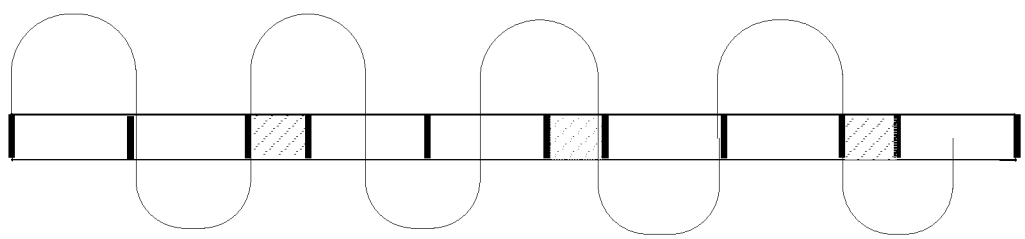
FIG. 3c is a schematic diagram illustrating a third fading result.
Figure 3D:
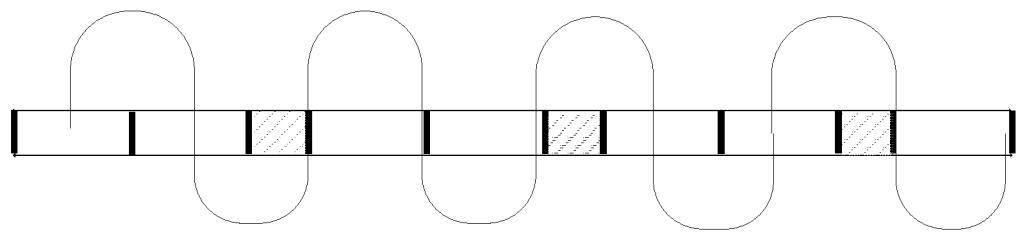
FIG. 3d is a schematic diagram illustrating a fourth fading result.

Assuming that the noise fading period of the Rayleigh fading channel is two times the length of the information field and referring to FIGS. 3c and 3d, in FIG. 3c, the first syncword and the second syncword avoid fading, and the third syncword is faded. In FIG. 3d, the first syncword is faded, and the second syncword and the third syncword avoid fading.

It can be seen from FIGS. 3a to 3d that, when the noise fading period of the Rayleigh fading channel is the same as or two times the length of the information field, it is ensured that at least one syncword can be detected by the receiver, so that frame alignment information of the data can be determined and the frame loss rate can be reduced. When the noise fading period of the Rayleigh fading channel is not an integer times the length of the information field, by taking the positional scheme of the three syncwords in FIG. 2a as an example, and assuming that a length of a syncword is N, a length of an information field is 2N and a noise fading period is 2(N−a) times the length of the information field, fading occurs at positions of 2N−2a, 4N−4a, 6N−6a . . . or N−a, 3N−2a, 5N−5a . . . .

Figure 3E:
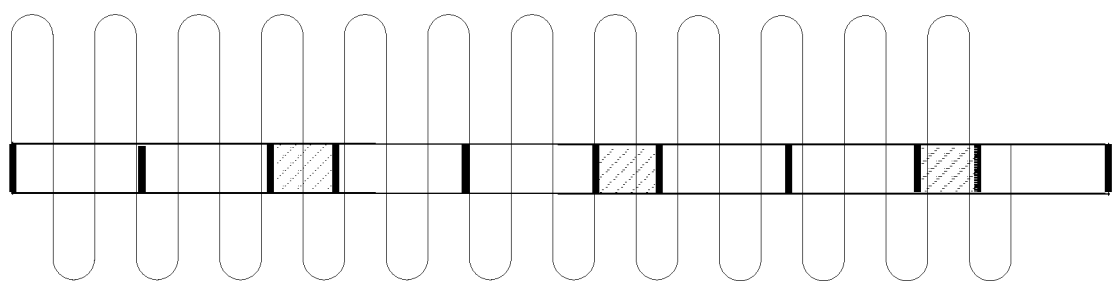
FIG. 3e is a schematic diagram illustrating a fifth fading result.

If a is small and can be ignored, the fading result is consistent with the case that the fading period is N. Otherwise, assuming that a is N/4, fading occurs at positions of 2N−N/2, 3N, 6N−3N/2 . . . or N−N/4, 3N−N/2, 4N . . . , in which case it can be avoided that all the three syncwords are at fading positions. In the above case, even if a syncword is at the fading position, the syncword is not entirely in the fading position, as shown in FIG. 3e. In FIG. 3e, part of each of the first syncword, the second syncword and the third syncword is at the fading position, while the syncword can be detected by the receiver since the syncword is not entirely in the fading position.

A method for detecting a syncword is provided according to the embodiment. After inserting the preset number of syncwords into the data frame to be sent, the transmitter sends the data frame to be sent inserted with the preset number of syncwords to the receiver. The length of the information field in the data frame to be sent inserted with the preset number of syncwords is a specified number times the length of the syncword, and the preset number of syncwords has different compositions of symbols or are composed of same symbols but with orders of the symbols being different. Thus, it is ensured that at least one syncword can be detected, so that the position of at least one syncword can be determined, thereby identifying frame alignment information of data and reducing the frame loss rate.

Figure 4:
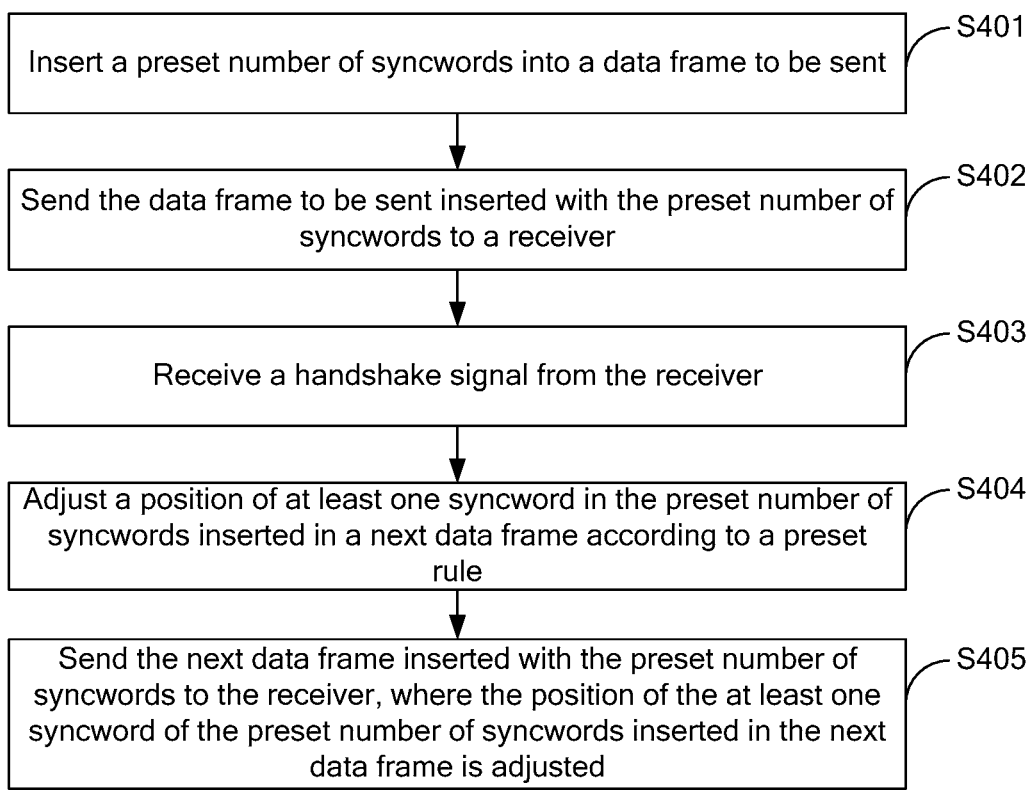
FIG. 4 is a schematic diagram of a method for detecting a syncword applied to a transmitter according to another embodiment of the present disclosure.

Optionally, in an embodiment of the present disclosure, referring to FIG. 4, the method further includes the following steps S403 and S404 after sending the data frame to be sent inserted with the preset number of syncwords to the receiver.

In step S403, a handshake signal from the receiver is received.

After the data frame to be sent is sent to the receiver, the receiver may perform a cross-correlation process between each syncword of the preset number of syncwords and the data frame to be sent inserted with the preset number of syncwords. In a case at least two syncwords of the preset number of syncwords inserted in the data frame to be sent are not detected, the handshake signal sent by the receiver is received.

In step S404, a position of at least one syncword of the preset number of syncwords inserted in a next data frame is adjusted according to a preset rule, where the preset rule is that positions of the preset number of syncwords in the next data frame exclude a position of at least one syncword of the preset number of syncwords in the data frame to be sent, where the at least one syncword is not detected by the receiver, and the next data frame is a data frame arranged behind the data frame to be sent and has a smallest distance from the data frame to be sent.

By adjusting the position of at least one syncword of the preset number of syncwords inserted in the next data frame, it is ensured that at least two syncwords in the data frame received by the receiver can be detected by the receiver.

It should be noted that, adjusting the position of at least one syncword of the preset number of syncwords inserted in the next data frame is self-adaptive adjustment.

For a clearer understanding of the preset rule by those skilled in the art, an explanation will now be given in conjunction with FIGS. 5a to 5c.

The tool used in the simulation in this embodiment is a matrix laboratory matlab2012b, and the modulation mode is frequency shift keying 4FSK modulation. The Gaussian noise channel model and the Rayleigh noise plus Gaussian noise channel model are used in the modeling. The signal-to-noise ratio of the Gaussian channel varies from −20 dB to 0 dB. An urban environment model is applied to the Rayleigh channel, that is, the Doppler frequency shift is 20 Hz, the multipath delay is [0 5e-6], the multipath gain is [0 −22.3], and the amount of data in the simulation is 288×5e3 bit. A process of detecting one frame and blurring two frames is applied when collecting statistics of frame loss rate in the simulation.

Figure 5A:
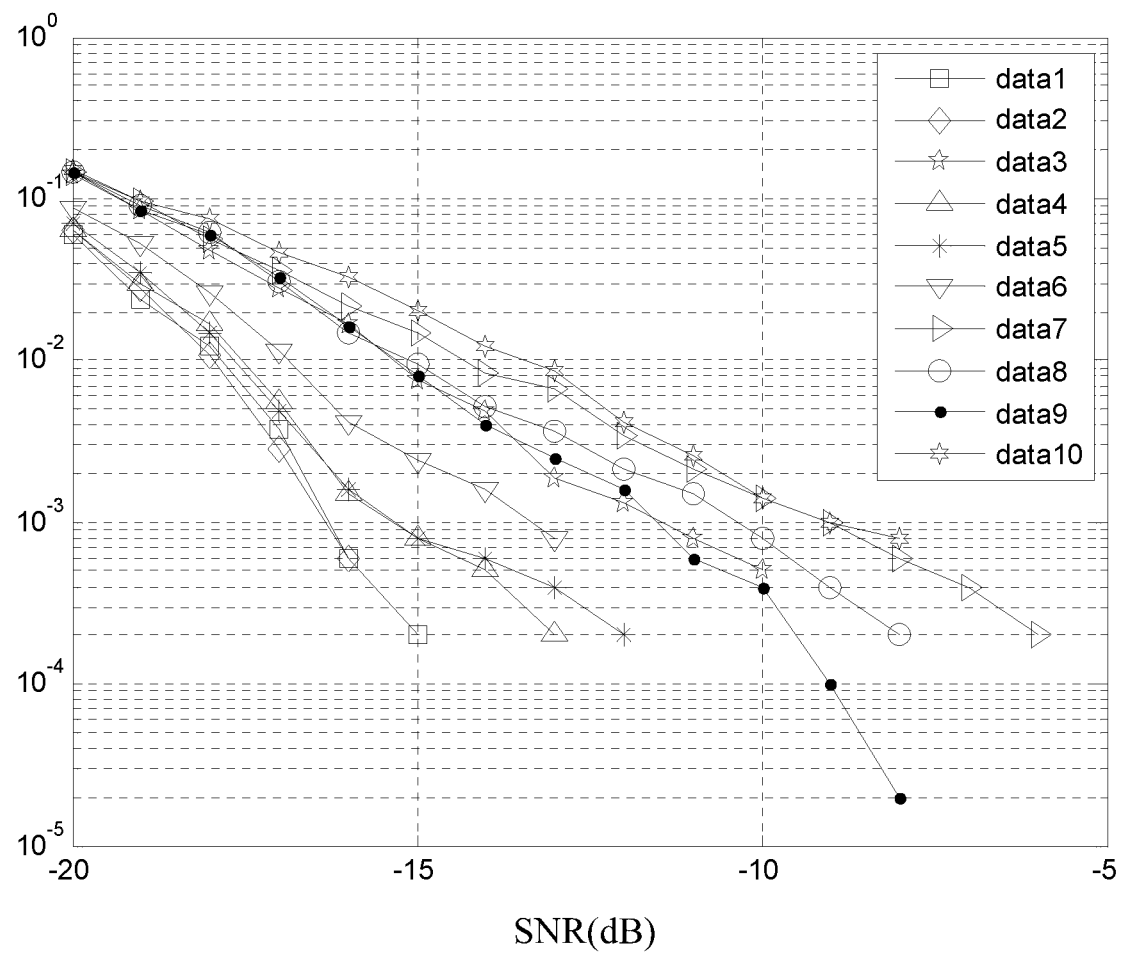
FIG. 5a is a comparison diagram of results of syncword detection by applying the data frame structures of FIGS. 2a to 2j.

The curves data1 to data10 in FIG. 5a respectively represent detection results of the syncwords based on positional distribution schemes of the three syncwords as shown in FIGS. 2a to 2j. The curve data1 corresponds to FIG. 2a, the curve data2 corresponds to FIG. 2b, and continuing by analogy, the curve data10 corresponds to FIG. 2j. In FIG. 5a, the horizontal coordinate SNR represents a signal-to-noise ratio and the vertical coordinate represents a frame loss rate.

It can be seen from FIG. 5a that, under the same conditions, detecting performances by adopting positional distribution schemes of the three syncwords as shown in FIGS. 2a, 2b, 2d and 2e are the best. When adopting the positional distribution scheme of the three syncwords in FIG. 2a, there is no frame loss in a case that a bit error rate is lower than 8.9%. When adopting the positional distribution scheme of the three syncwords in FIG. 2b, there is no frame loss in a case that the bit error rate is lower than 10.9%. In this embodiment, when the position of the syncword needs to be adjusted, under the condition that the preset rule is satisfied, the four positional distribution schemes in FIGS. 2a, 2b, 2d and 2e are, in one embodiment, selected. When the four positional distribution schemes in FIGS. 2a, 2b, 2d and 2e do not satisfy the condition, a scheme conforming to the preset rule is selected from FIGS. 2c, 2f, 2g, 2h, 2i and 2j.

Figure 5B:
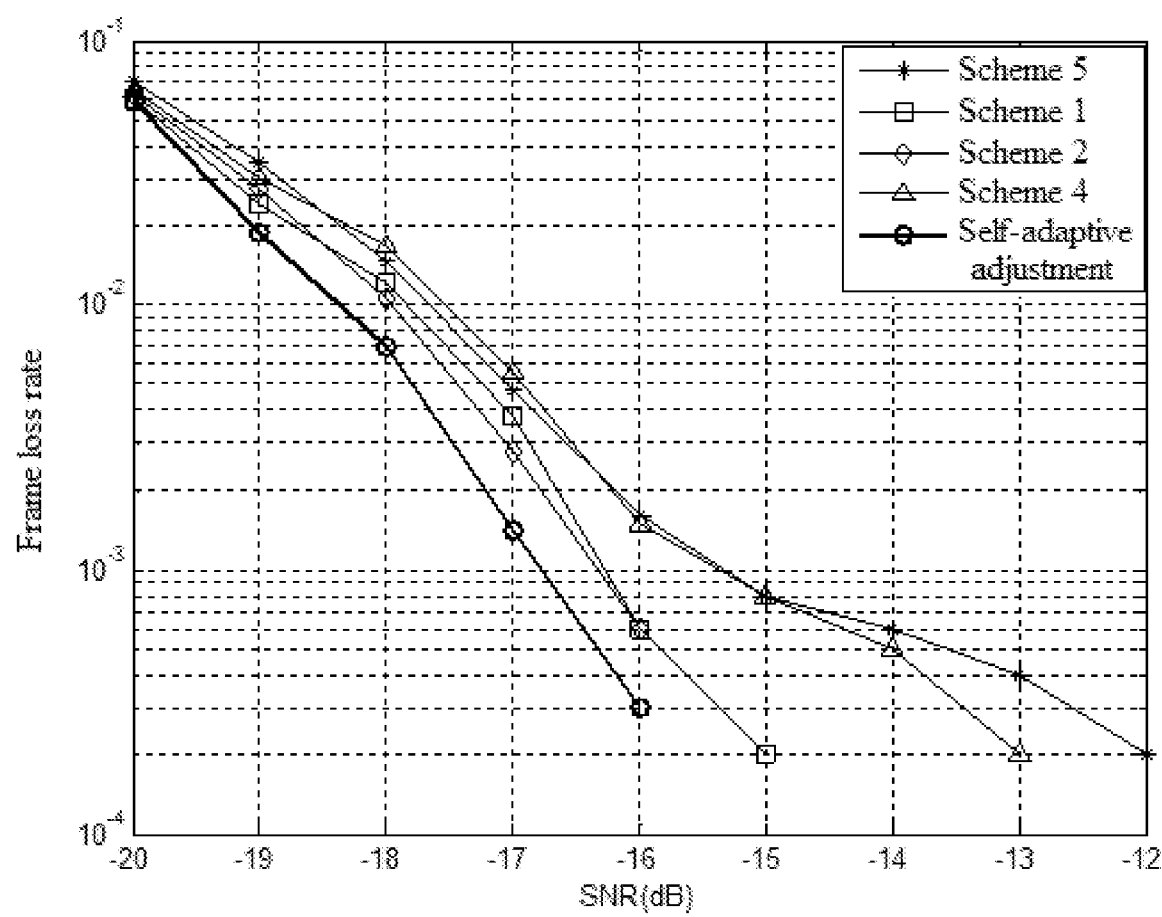
FIG. 5b is a comparison diagram of results of syncword detection by applying a self-adaptive adjustment scheme.
Figure 5C:
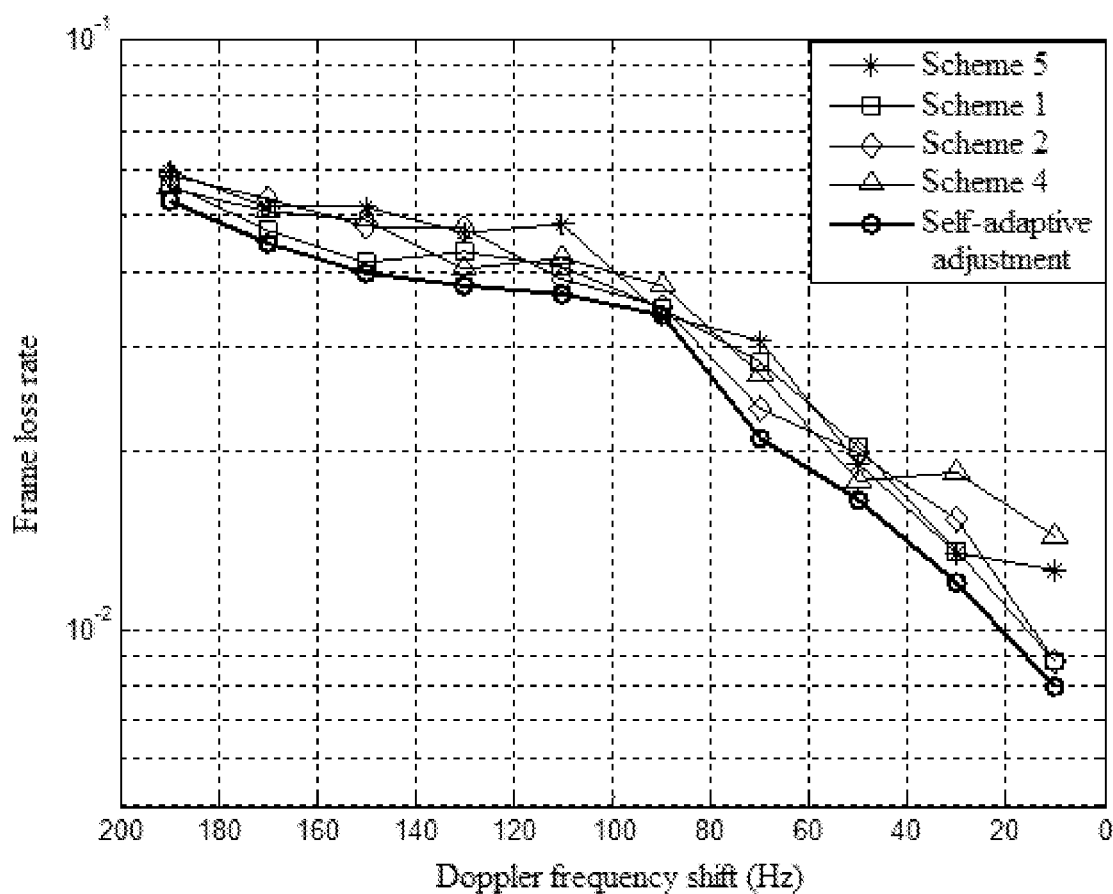
FIG. 5c is a another comparison diagram of results of syncword detection by applying a self-adaptive adjustment scheme.

When it is necessary to adjust the position of the syncword, a self-adaptive adjustment scheme is compared with the four schemes in FIGS. 2a, 2b, 2d and 2e under the condition that the preset rule is satisfied, which is shown in FIGS. 5b and 5c.

FIG. 5b is a comparison diagram of results before and after adjusting positions of the three syncwords when a signal-to-noise ratio of the Gaussian channel changes and conditions (fd=20 Hz) of the Rayleigh channel are constant. The horizontal coordinate SNR represents a signal-to-noise ratio, the vertical coordinate represents a frame loss rate, and the curve of scheme 1 is a result of the syncword detection after adopting the scheme in FIG. 2a. The curve of scheme 2 is a result of the syncword detection after adopting the scheme in FIG. 2b. The curve of scheme 4 is a result of the syncword detection after adopting the scheme in FIG. 2d. The curve of scheme 5 is a result of the syncword detection after adopting the scheme in FIG. 2e. The self-adaptive curve is a result of the syncword detection after adjusting the syncwords according to the preset rule in a case that positions of the syncwords need to be adjusted. It can be seen from FIG. 5b that, the self-adaptive position adjustment scheme can reduce the frame loss rate.

FIG. 5c is a comparison diagram of results before and after adjusting positions of the three syncwords when the Rayleigh channel Doppler frequency shift changes and conditions (SNR=−18 dB) of the Gaussian channel are constant. The horizontal coordinate represents a Doppler frequency shift, and the vertical coordinate represents a frame loss rate. The curve of scheme 1 is a result of the syncword detection after adopting the scheme in FIG. 2a. The curve of scheme 2 is a result of the syncword detection after adopting the scheme in FIG. 2b. The curve of scheme 4 is a result of the syncword detection after adopting the scheme in FIG. 2d. The curve of the scheme 5 is a result of the syncword detection after adopting the scheme in FIG. 2e. The self-adaptive curve is a result of the syncword detection after adjusting the syncwords according to the preset rule in a case that positions of the syncwords need to be adjusted. It can be seen from FIG. 5c that, the self-adaptive position adjustment scheme can reduce the frame loss rate.

In step S404, the next data frame is sent to the receiver, where the position of the at least one syncword of the preset number of syncwords inserted in the next data frame is adjusted.

In this embodiment, the position of at least one syncword of the preset number of syncwords inserted in the next data frame is adjusted according to the preset rule. Thus, it is ensured that at least one syncword in the data frame received by the receiver can be detected, to thereby guarantee that at least one correlation peak can be detected, so that the position of at least one syncword can be determined, thereby identifying the frame alignment information of the data and reducing the frame loss rate.

Figure 6:
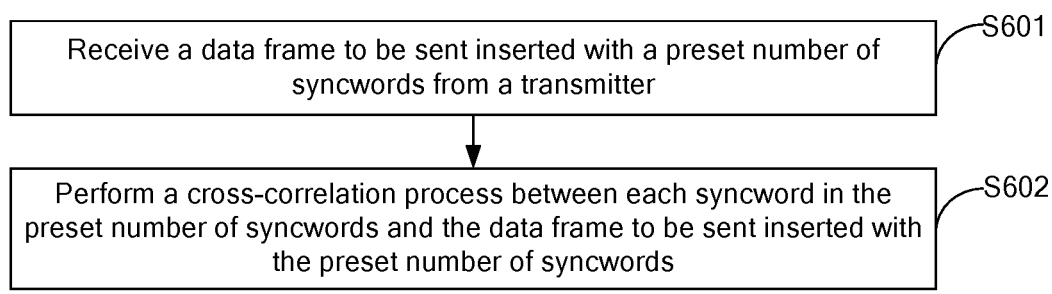
FIG. 6 is a schematic diagram of a method for detecting a syncword applied to a receiver according to an embodiment of the present disclosure.

A method for detecting a syncword applied to a receiver is provided according to an embodiment of the present disclosure, as shown in FIG. 6, where the method includes the following steps S601 and S602.

In step S601, a data frame to be sent inserted with a preset number of syncwords from a transmitter is received.

In step S602, a cross-correlation process between each syncword of the preset number of syncwords and the data frame to be sent inserted with the preset number of syncwords is performed.

Specifically, by adopting a correlation detection method, correlation between two parts of a signal or between two signals may be found from a noise or from other unrelated signals, to determine similarity thereof and detect and extract signal features. The expression for a short-term cross-correlation function with N sample points is:

$$R_{xy}(n) = \frac{1}{N}\sum_{k=0}^{N-1} x(k)y(n+k)$$

where N denotes a length of a sample sequence of a signal to be processed in time domain, n denotes a delay length, k denotes a serial number of time-domain sample, x denotes an input signal sequence, y denotes a channel function, and R denotes a received signal sequence.

Since the data structure is known in advance, according to the above formula, the syncword is used as a matched filter, and correlation values corresponding to the sum of a received signal and a syncword at different delay instants are respectively calculated. An instant when the correlation value reaches maximum and is greater than a certain threshold is determined as the end of the syncword in the data frame.

In this embodiment, the data frame to be sent inserted with the preset number of syncwords sent by the transmitter is received. The cross-correlation process between each syncword of the preset number of syncwords and the data frame to be sent inserted with the preset number of syncwords is performed. Thus, it is ensured that at least one correlation peak can be detected, so that the position of at least one syncword can be determined, thereby identifying the frame alignment information of the data and reducing the frame loss rate.

Figure 7:
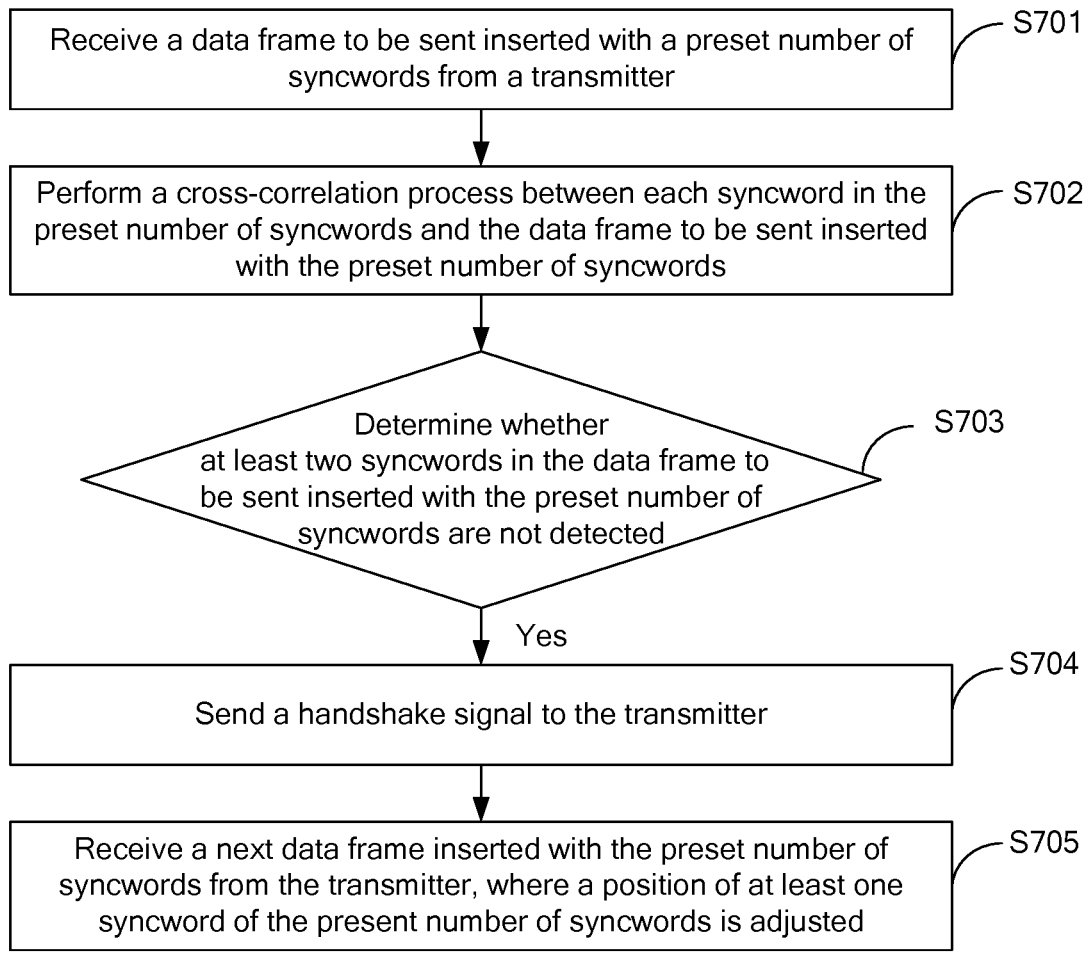
FIG. 7 is a schematic diagram of a method for detecting a syncword applied to a receiver according to another embodiment of the present disclosure.

Optionally, in another embodiment of the present disclosure, as shown in FIG. 7, after performing the cross-correlation process between each syncword of the preset number of syncwords and the data frame to be sent inserted with the preset number of syncwords, the method further includes the following steps S703 to S705.

In step S703, whether at least two syncwords in the data frame to be sent inserted with the preset number of syncwords are not detected is determined, where the step S704 is executed in a case that at least two syncwords in the data frame to be sent inserted with the preset number of syncwords are not detected.

In step S704, a handshake signal is sent to the transmitter.

In step S705, a next data frame inserted with the preset number of syncwords from the transmitter is received, where a position of at least one syncword of the present number of syncwords is adjusted.

In this embodiment, after detecting the syncwords by means of cross-correlation, the handshake signal is sent to the receiver, in a case that at least two syncwords in the data frame to be sent inserted with the preset number of syncwords are not detected, for the receiver to adjust the position of at least one syncword of the inserted preset number of syncwords, ensuring that at least one syncword can be detected by the receiver and thereby reducing the frame loss rate.

Figure 8:
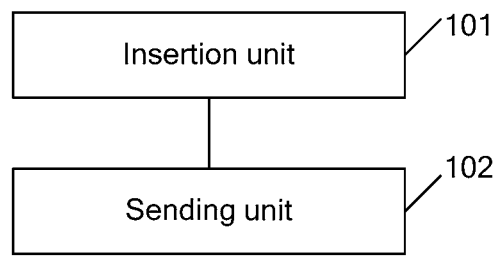
FIG. 8 is a schematic diagram of a device for detecting a syncword applied to a transmitter according to an embodiment of the present disclosure.

A device for detecting a syncword applied to a transmitter is provided according to another embodiment of the present disclosure, and as shown in FIG. 8, the device includes an insertion unit 101 and a sending unit 102.

The insertion unit 101 is configured to insert a preset number of syncwords into a data frame to be sent. A length of an information field in the data frame to be sent inserted with the preset number of the syncwords is a specified number times a length of the syncword. The preset number of syncwords have different compositions of symbols or are composed of same symbols but with orders of the symbols being different from each other.

The sending unit 102 is configured to send the data frame inserted with the preset number of syncwords to a receiver.

In this embodiment, after the insertion unit 101 inserts the preset number of syncwords in the data frame to be sent, the sending unit 102 sends the data frame inserted with the preset number of syncwords to the receiver. In this way, it is ensured that at least one syncword is detected in the receiver, thereby reducing the frame loss rate.

It is noted that, reference can be made to corresponding description in the embodiment of FIG. 1 for the operating process of each unit in this embodiment, which is not described again herein for simplicity.

Figure 9:
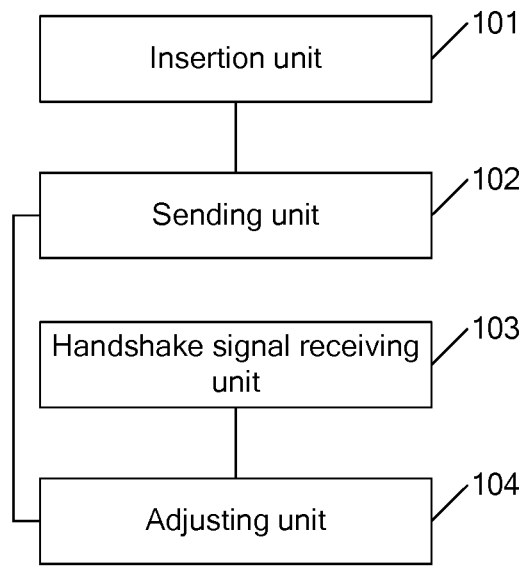
FIG. 9 is a schematic diagram of a device for detecting a syncword applied to a transmitter according to another embodiment of the present disclosure.

Optionally, in another embodiment of the present disclosure, as shown in FIG. 9, the device for detecting a syncword applied to a transmitter further includes a handshake signal receiving unit 103 and an adjusting unit 104.

The handshake signal receiving unit 103 is configured to receive a handshake signal sent by the receiver after the sending unit 102 sends the data frame to be sent inserted with the preset number of syncwords to the receiver.

The adjusting unit 104 is configured to adjust a position of at least one syncword of the preset number of syncwords inserted in a next data frame according to a preset rule. The preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent.

The sending unit 102 is further configured to send the next data frame to the receiver, where the position of the at least one syncword of the preset number of syncwords inserted in the next data frame is adjusted.

In this embodiment, in a case that at least two syncwords are not detected in the receiver, the handshake signal sent by the receiver is received by the handshake signal receiving unit 103. The adjusting unit 104 adjusts the position of at least one syncword of the preset number of syncwords inserted in the next data frame according to the preset rule. The sending unit 102 sends the next data frame inserted with the preset number of syncwords of which the position of at least one syncword is adjusted to the receiver. In this way, it is ensured that at least one syncword can be detected in the receiver, thereby reducing the frame loss rate.

It is noted that, reference can be made to corresponding description in the embodiment of FIG. 4 for the operating process of the each unit in this embodiment, which is not described again herein for simplicity.

Figure 10:
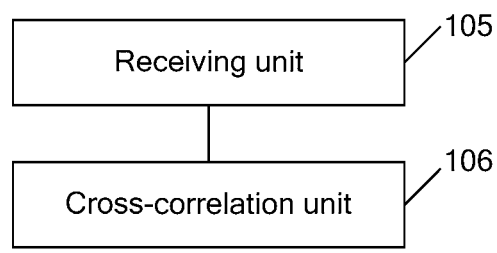
FIG. 10 is a schematic diagram of a device for detecting a syncword applied to a receiver according to an embodiment of the present disclosure.

A device for detecting a syncword applied to a receiver is provided according to another embodiment of the present disclosure, and as shown in FIG. 10, the device includes a receiving unit 105 and a cross-correlation unit 106.

The receiving unit 105 is configured to receive a data frame to be sent inserted with a preset number of syncwords from a transmitter.

The cross-correlation unit 106 is configured to perform a cross-correlation process between each syncword of the preset number of syncwords and the data frame to be sent inserted with the preset number of syncwords.

In this embodiment, the receiving unit 105 receives the data frame to be sent inserted with the preset number of syncwords from the transmitter. The cross-correlation unit 106 performs the cross-correlation process between each syncword of the preset number of syncwords and the data frame to be sent inserted with the preset number of syncwords. In this way, it is ensured that at least one syncword can be detected when the receiver detects syncwords, thereby reducing the frame loss rate.

It is noted that, reference can be made to corresponding description in the embodiment of FIG. 6 for the operating process of each unit in this embodiment, which is not described again herein for simplicity.

Figure 11:
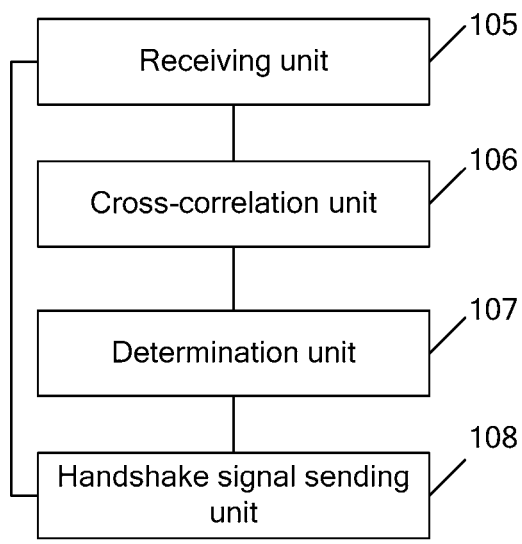
FIG. 11 is a schematic diagram of a device for detecting a syncword applied to a receiver according to another embodiment of the present disclosure.

Optionally, in another embodiment of the present disclosure, as shown in FIG. 11, the device for detecting a syncword applied to a receiver further includes a determination unit 107 and a handshake signal sending unit 108.

The determination unit 107 is configured to determine whether at least two syncwords in the data frame to be sent inserted with the preset number of syncwords are not detected.

The handshake signal sending unit 108 is configured to send a handshake signal to the transmitter in a case that at least two syncwords in the data frame to be sent inserted with the preset number of syncwords are not detected.

The receiving unit 105 is further configured to receive a next data frame inserted with the preset number of syncwords from the transmitter, where a position of at least one syncword of the preset number of syncwords inserted in the next data frame is adjusted.

In this embodiment, after the determination unit 107 determines whether at least two syncwords in the data frame to be sent inserted with the preset number of syncwords are not detected, the handshake signal sending unit 108 sends the handshake signal to the transmitter for the transmitter to adjust the position of the syncword in a timely manner. In this way, it is ensured that at least one syncword can be detected by the receiver, thereby reducing the frame loss rate.

It is noted that, reference can be made to corresponding description in the embodiment of FIG. 7 for the operating process of each unit in this embodiment, which is not described again herein for simplicity.

For a clear understanding of technical effects brought by the present disclosure, the insertion of a single syncword, two syncwords, two lengthened syncwords, three syncwords, and three lengthened syncwords will be described for example.

Structures of data frames inserted with two syncwords, two lengthened syncwords, three syncwords and three lengthened syncwords are shown in FIGS. 12a to 12d. Redundant fields are not placed in protection fields in FIGS. 12a to 12d, but are placed directly in the data frame.

Figure 12A:
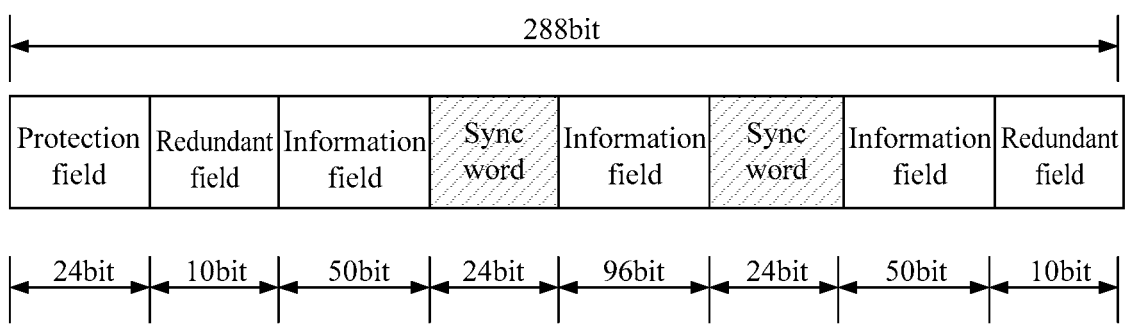
FIG. 12a is schematic structural diagram of a data frame after being inserted with two syncwords.

FIG. 12a is a structural schematic diagram of a data frame inserted with two syncwords. The data frame is 288 bits long, each syncword is 24 bits long, the protection field is 24 bits long, and the redundant field is 10 bits long. In this case, 196 information bits can be transmitted per frame, where the information field is 50 bits or 96 bits long.

Figure 12B:
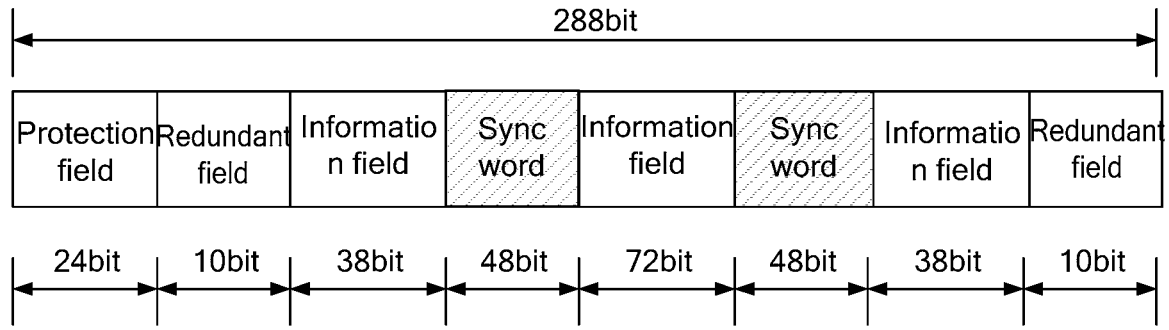
FIG. 12b is schematic structural diagram of a data frame after being inserted with two lengthened syncwords.

FIG. 12b is a structural schematic diagram of a data frame inserted with two lengthened syncwords. The data frame is 288 bits long, each syncword is 48 bits long, the protection field is 24 bits long, and the redundant field is 10 bits long. In this case, 148 information bits can be transmitted per frame, where the information field is 38 bits or 72 bits long.

Figure 12C:
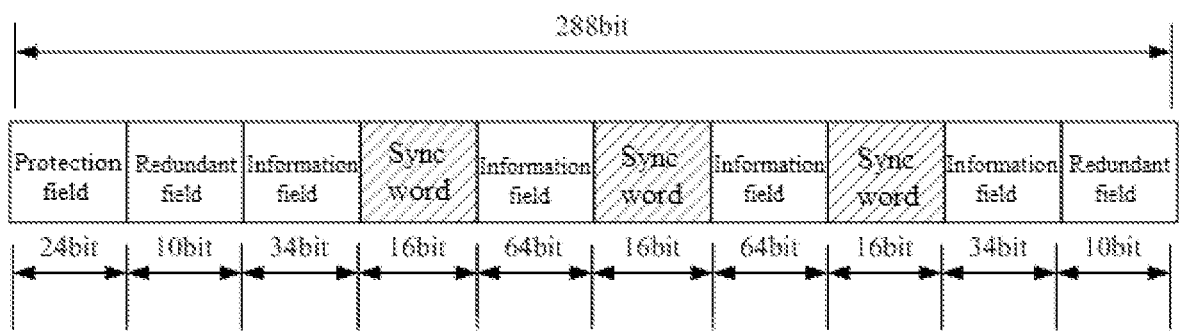
FIG. 12c is schematic structural diagram of a data frame after being inserted with three syncwords.

FIG. 12c is a structural schematic diagram of a data frame inserted with three syncwords. The data frame is 288 bits long, each syncword is 16 bits long, the protection field is 24 bits long, and the redundant field is 10 bits long. In this case, 196 information bits can be transmitted per frame, where the information field is 34 bits or 64 bits long.

Figure 12D:
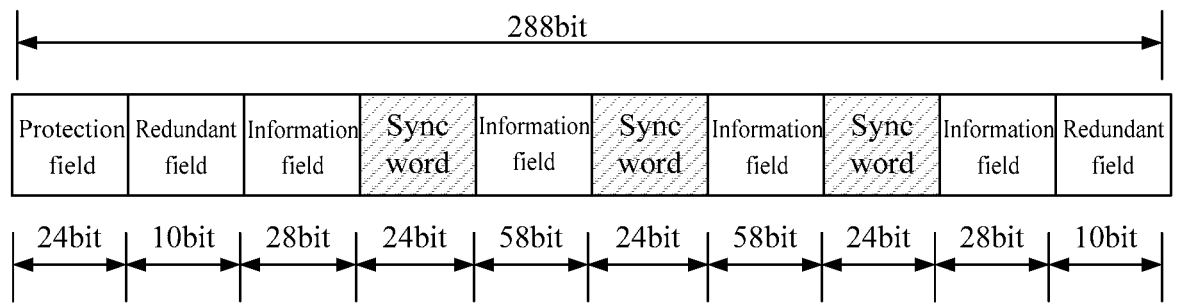
FIG. 12d is schematic structural diagram of a data frame after being inserted with three lengthened syncwords.

FIG. 12d is a structural schematic diagram of a data frame inserted with three lengthened syncwords. The data frame is 288 bits long, each syncword is 24 bits long, the protection field is 24 bits long, and the redundant field is 10 bits long. In this case, 172 information bits can be transmitted per frame, where the information field is 28 bits or 58 bits long.

After syncwords are located, the detected syncwords are compared with original syncwords, to determine whether a number of error bits satisfy the requirement. There are two methods to verify the syncwords. The first method is to directly compare the detected syncwords (forward and reverse) with the original syncwords (forward and reverse) to obtain the number of error bits. The second method is to calculate positions of other syncwords based on the position of the detected syncwords, reverse the reverse syncword, multiply each syncword by an appropriate coefficient, add all the multiplied syncwords to obtain a sum thereof, and compare the sum with the original forward syncword to obtain the number of error bits. Taking detection of the two lengthened syncwords as an example, the results of the two methods for verifying syncwords are shown in FIG. 13.

Figure 13:
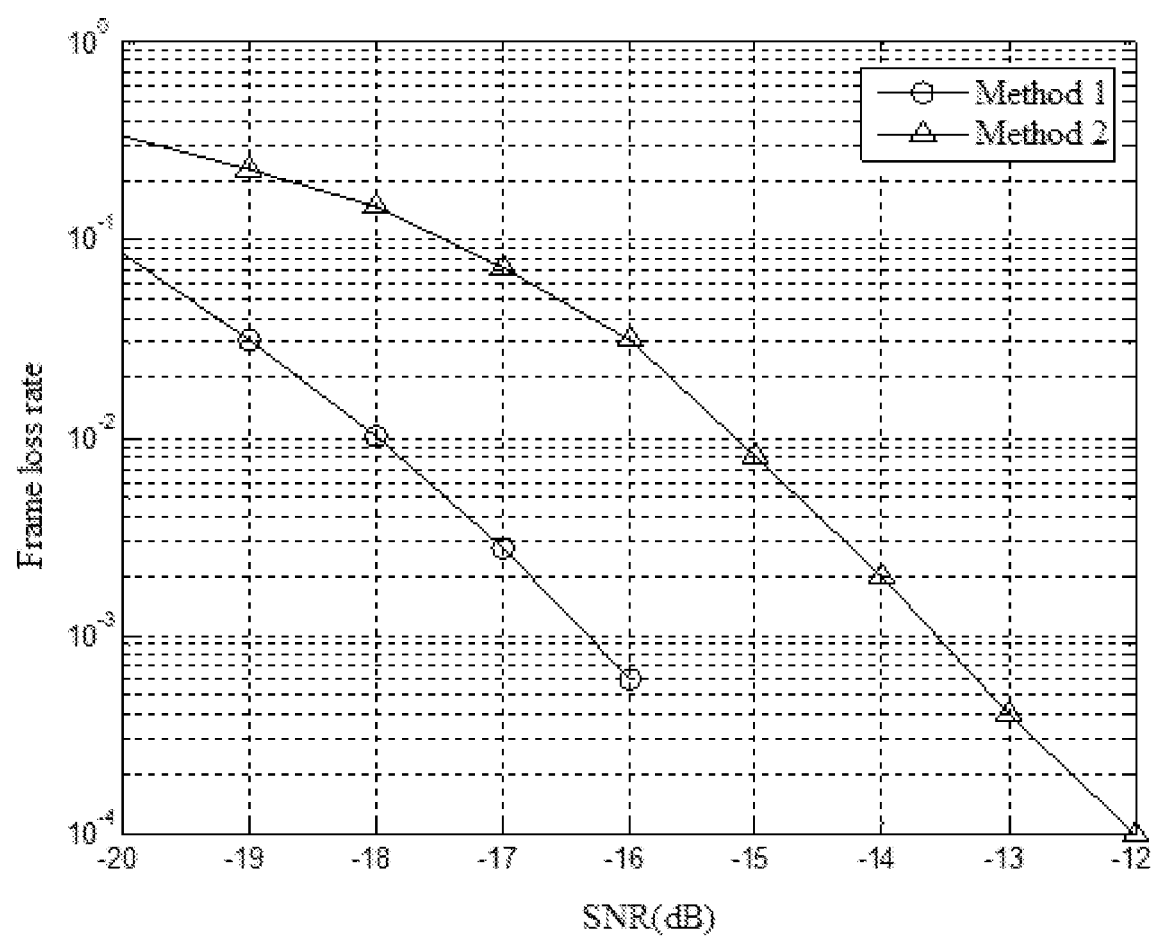
FIG. 13 is a comparison diagram of results of syncword checking in different ways.

The curve of method 1 in FIG. 13 is a detection result obtained by the first method, and the curve of method 2 is a detection result obtained by the second method. The horizontal coordinate represents a signal-to-noise ratio, and the vertical coordinate represents a frame loss rate. It can be seen from FIG. 13 that, under the same signal-to-noise ratio condition, the frame loss rate obtained by the first method is lower than that obtained by the second method, and the detection performance of the first method is better. This is because the multiple syncwords are at different positions of a code group and the degrees of channel interference for the syncwords are different. When performing the summation operation, a weakly disturbed syncword iterates the influence from a syncword that is strongly disturbed, which makes the distortion more serious and affects the detection performance.

Figure 14:
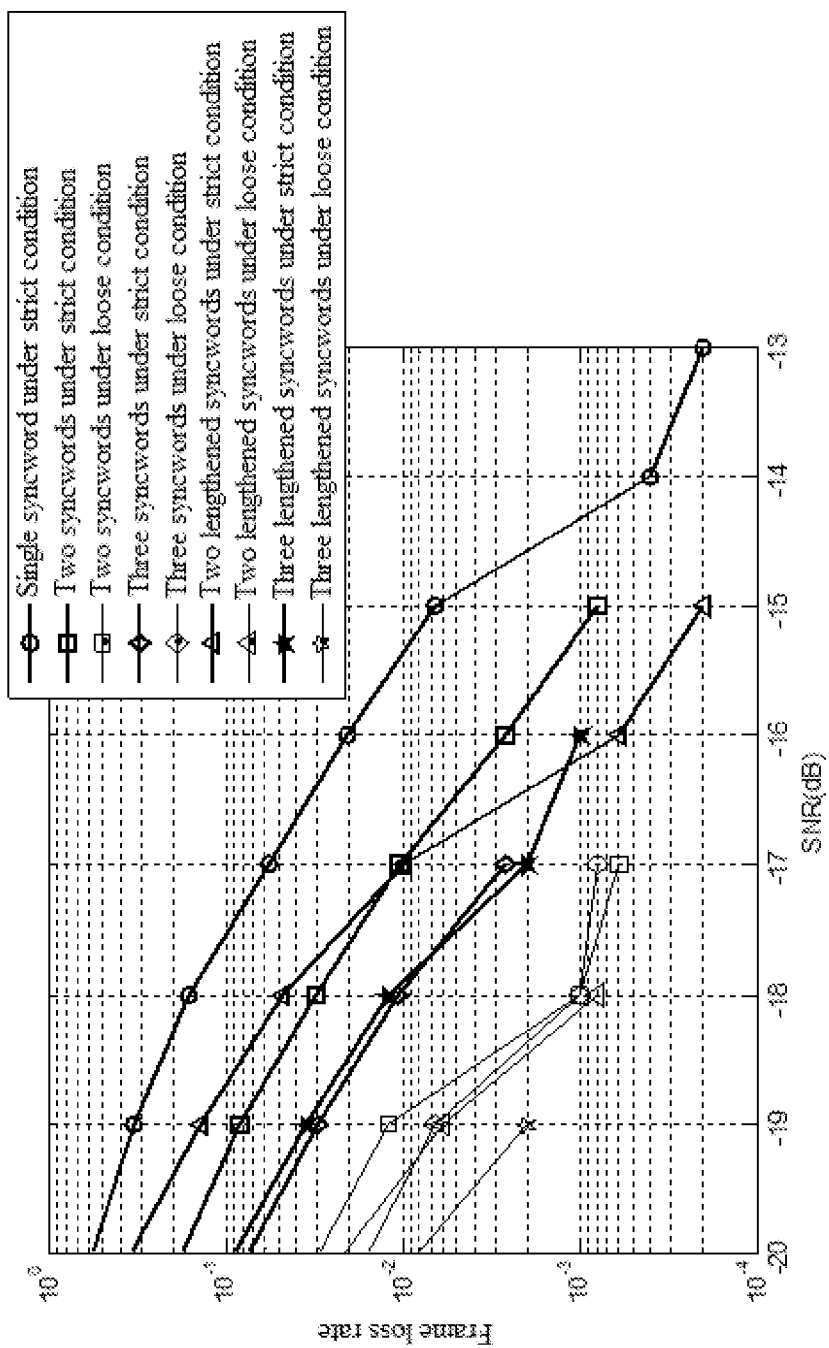
FIG. 14 is a comparison diagram of results of inserting different types of syncwords.

Thereafter, detection results of the inserted single syncword, two syncwords, two lengthened syncwords, three syncwords and three lengthened syncwords are analyzed by using the first method, as shown in FIG. 14. In FIG. 14, a Gaussian channel is adopted, the horizontal coordinate represents a signal-to-noise ratio and the vertical coordinate represents a frame loss rate. The loose condition refers to that a threshold of peak value of correlation peak is 0.7, and a threshold of syncword error is 10%. The strict condition refers to that the threshold of peak value of correlation peak is 0.5, and the threshold of syncword error is 20%.

It can be seen from FIG. 14 that, in a Gaussian channel model, the frame loss rate of the simulation result in each scheme under the loose condition is lower than the frame loss rate under the strict condition. Comparing the simulation results in different schemes, when a total number of bits of the syncwords are constant, the performance of detecting with two syncwords is better than that of detecting with a single syncword, and the performance of detecting with three syncwords is the best. Under the strict condition, the performances of detecting with two lengthened syncwords and detecting with three lengthened syncwords are not improved, while the performances thereof under the loose condition are significantly improved. The frame loss rates under the strict condition are ranked in the following order: the frame loss rate of three syncwords≈the frame loss rate of three lengthened syncwords<the frame loss rate of two syncword<the frame loss rate of two lengthened syncwords<the frame loss rate of a single syncword. By adopting the scheme of detecting with three syncwords, when the bit error rate is lower than 8.2%, zero frame loss can be achieved.

In the actual wireless communications process, it is also necessary to consider the fading of the signal itself, and the process is simulated by Rayleigh noise in the simulation. The performance of detecting with multiple syncwords when the channel conforms to a channel mode with Rayleigh noise plus Gaussian noise, which is shown in FIG. 15.

Figure 15:
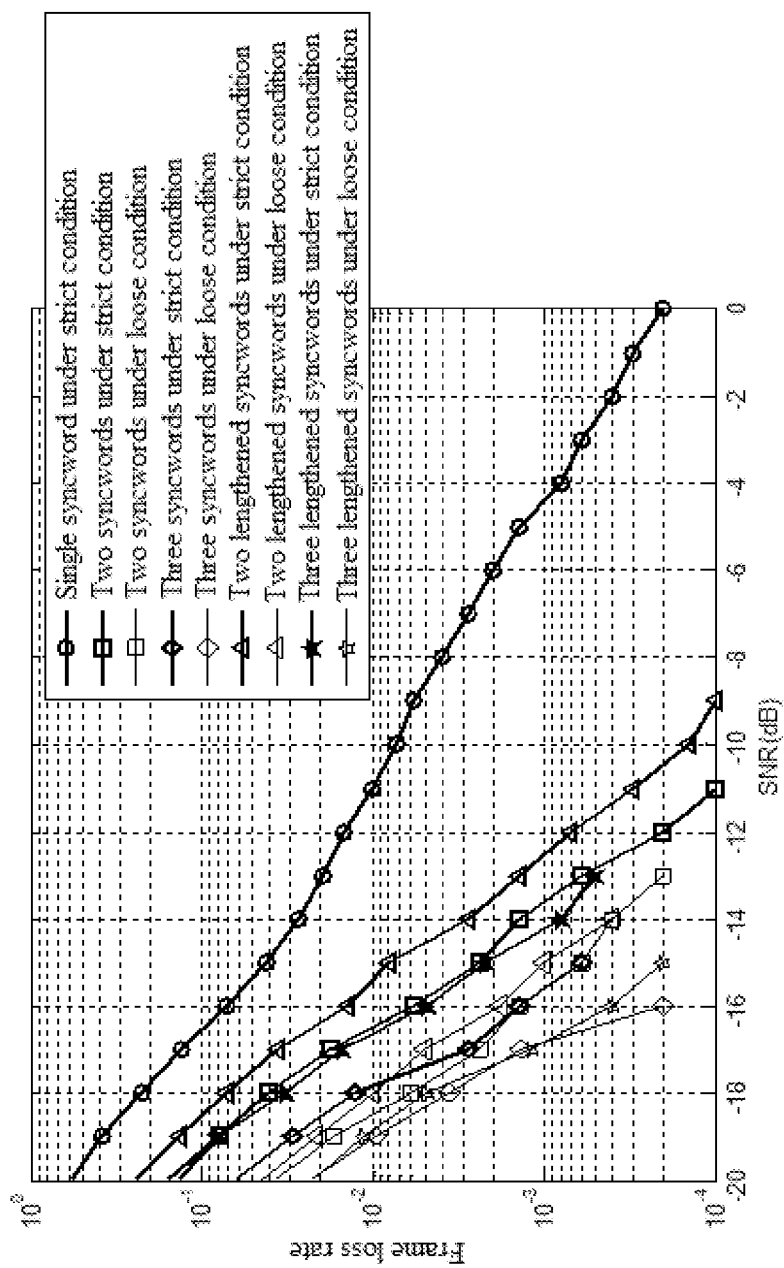
FIG. 15 is another comparison diagram of results of inserting different types of syncwords.

It can be seen from FIG. 15 that, in the channel mode with Rayleigh noise plus Gaussian white noise, the frame loss rate of the simulation result in each scheme under the loose condition is lower than the frame loss rate under the strict condition. Comparing the simulation results in different schemes, when the total bit number of the syncwords is constant, the performance of detecting with two syncwords is better than that of detecting with a single syncword, and the performance of detecting with three syncwords is the best. The performance of detecting with two lengthened syncwords is worse than that of detecting with two syncwords. The performance of detecting with three lengthened syncwords is worse than that of detecting with three syncwords. The frame loss rates under the strict condition are ranked in the following order: the frame loss rate of three syncwords<the frame loss rate of three lengthened syncwords<the frame loss rate of two syncwords<the frame loss rate of two lengthened syncwords<the frame loss rate of a single syncword. By adopting the scheme of detecting with three syncwords under the strict condition, when the bit error rate is lower than 10.9%, zero frame loss can be achieved. By adopting the scheme of detecting with three syncwords under the loose condition, when the bit error rate is lower than 12.6%, zero frame loss can be achieved.

Optionally, in another embodiment of the present disclosure, a transmitter is provided. The transmitter includes a memory and a processor, where the memory is configured to store a program, and the processor is configured to call the computer program to:

insert a preset number of syncwords into a data frame to be sent, where a length of an information field in the data frame to be sent inserted with the preset number of syncwords is a specified number times a length of the syncword, and the preset number of syncwords have different compositions of symbols or are composed of same symbols but with orders of the symbols being different from each other; and send the data frame inserted with the preset number of syncwords to a receiver.

Based on the above embodiment, after sending the data frame inserted with the preset number of syncwords to the receiver, the processor is further configured to:

receive a handshake signal from the receiver;

adjust, according to a preset rule, a position of at least one syncword of the preset number of syncwords inserted in a next data frame, where the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent; and send the next data frame to the receiver, where the position of the at least one syncword of the preset number of syncwords inserted in the next data frame is adjusted.

In this embodiment, after inserting the preset number of syncwords in the data frame to be sent, the transmitter sends the data frame to be sent inserted with the preset number of syncwords to the receiver. The length of the information field in the data frame to be sent inserted with the preset number of syncwords is a specified number times the length of the syncword, and the preset number of syncwords have different compositions of symbols or are composed of same symbols but with orders of the symbols being different from each other. Thus, it is ensured that at least one syncword can be detected, so that the position of at least one syncword can be determined, thereby identifying frame alignment information of data and reducing the frame loss rate.

Optionally, a receiver is provided according to another embodiment of the present disclosure, which includes: a memory and a processor, where the memory is configured to store a program, and the processor is configured to call the program to:

receive a data frame to be sent inserted with a preset number of syncwords from a transmitter; and perform a cross-correlation process between each syncword of the preset number of syncwords and the data frame to be sent inserted with the preset number of syncwords.

Based on the above embodiment, after performing the cross-correlation process between each syncword of the preset number of syncwords and the data frame to be sent inserted with the preset number of syncwords, the processor is further configured to:

determine whether at least two syncwords in the data frame to be sent inserted with the preset number of syncwords are not detected;

send a handshake signal to the transmitter in a case that at least two syncwords in the data frame to be sent inserted with the preset number of syncwords are not detected; and receive, from the transmitter, a next data frame inserted with the preset number of syncwords, where a position of at least one syncword of the preset number of syncwords inserted in the next data frame is adjusted.

In this embodiment, the data frame to be sent inserted with the preset number of syncwords sent by the transmitter is received, and the cross-correlation process between each syncword of the preset number of syncwords and the data frame to be sent inserted with the preset number of syncwords is performed. Thus, it is ensured that at least one correlation peak can be detected, so that the position of at least one syncword can be determined, thereby identifying the frame alignment information of the data and reducing the frame loss rate.

Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but shall be defined by the broadest scope consistent with the principle and novel features disclosed herein.

The invention claimed is:

1. A method for detecting a syncword applied to a transmitter, the method comprising:

inserting a preset number of syncwords into a data frame to be sent, wherein a length of an information field in the data frame to be sent inserted with the preset number of syncwords is a specified number times a length of the syncword, and the preset number of syncwords have different compositions of symbols or are composed of same symbols but with orders of the symbols being different from each other; and sending the data frame to be sent inserted with the preset number of syncwords to a receiver, wherein after sending the data frame to be sent inserted with the preset number of syncwords to the receiver, the method further comprises:

receiving a handshake signal from the receiver;

adjusting, according to a preset rule, a position of at least one syncword of the preset number of syncwords inserted in a next data frame, wherein the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent; and sending the next data frame to the receiver, wherein the position of the at least one syncword of the preset number of syncwords inserted in the next data frame is adjusted.

2. The method for detecting a syncword according to claim 1, wherein positions of the preset number of syncwords in the data frame to be sent are arranged evenly.

3. The method for detecting a syncword according to claim 1, wherein the length of the information field in the data frame to be sent inserted with the preset number of syncwords is two times the length of the syncword.

4. The method for detecting a syncword according to claim 1, wherein the preset number is three.

5. The method for detecting a syncword according to claim 1, wherein the positions of the preset number of syncwords in the data frame to be sent are arranged unevenly.

6. A method for detecting a syncword applied to a receiver, the method comprising:
receiving a data frame to be sent inserted with a preset number of syncwords from a transmitter; and
performing a cross-correlation process between each syncword of the preset number of syncwords and the data frame to be sent inserted with the preset number of syncwords,
wherein after performing the cross-correlation process between each syncword of the preset number of syncwords and the data frame to be sent inserted with the preset number of syncwords, the method further comprises:
determining whether at least two syncwords in the data frame to be sent inserted with the preset number of syncwords are not detected;
sending a handshake signal to the transmitter in a case that it is determined at least two syncwords in the data frame to be sent inserted with the preset number of syncwords are not detected; and
receiving, from the transmitter, a next data frame inserted with the preset number of syncwords, wherein a position of at least one syncword of the preset number of syncwords inserted in the next data frame is adjusted.

7. A device for detecting a syncword applied to a transmitter, the device comprising:
an insertion unit, configured to insert a preset number of syncwords into a data frame to be sent, wherein a length of an information field in the data frame to be sent inserted with the preset number of syncwords is a specified number times a length of the syncword, and the preset number of syncwords have different compositions of symbols or are composed of same symbols but with orders of the symbols being different from each other;
a sending unit, configured to send the data frame inserted with the preset number of syncwords to a receiver; and,
a handshake signal receiving unit, configured to receive a handshake signal from the receiver after the sending unit sends the data frame to be sent inserted with the preset number of syncwords to the receiver; and
an adjusting unit, configured to adjust, according to a preset rule, a position of at least one syncword of the preset number of syncwords inserted in a next data frame, wherein the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent,
wherein the sending unit is further configured to send the next data frame to the receiver, wherein the position of the at least one syncword of the preset number of syncwords inserted in the next data frame is adjusted.

8. A device for detecting a syncword applied to a receiver, the device comprising:
a receiving unit, configured to receive a data frame to be sent inserted with a preset number of syncwords from a transmitter;
a cross-correlation unit, configured to perform a cross-correlation process between each syncword of the preset number of syncwords and the data frame to be sent inserted with the preset number of syncwords; and
a determination unit, configured to determine, after the cross-correlation unit performs the cross-correlation process between each syncword of the preset number of syncwords and the data frame to be sent inserted with the preset number of syncwords, whether at least two syncwords in the data frame to be sent inserted with the preset number of syncwords are not detected; and
a handshake signal sending unit, configured to send a handshake signal to the transmitter in a case that the determination unit determines at least two syncwords in the data frame to be sent inserted with the preset number of syncwords are not detected,
wherein the receiving unit is further configured to receive, from the transmitter, a next data frame inserted with the preset number of syncwords, wherein a position of at least one syncword of the preset number of syncwords inserted in the next data frame is adjusted.

9. A transmitter, comprising: a memory and a processor, wherein the memory is configured to store a program, and the processor is configured to call the program to:
insert a preset number of syncwords into a data frame to be sent, wherein a length of an information field in the data frame to be sent inserted with the preset number of syncwords is a specified number times a length of the syncword, and the preset number of syncwords have different compositions of symbols or are composed of same symbols but with orders of the symbols being different from each other; and
send the data frame inserted with the preset number of syncwords to a receiver,
wherein after sending the data frame inserted with the preset number of syncwords to the receiver, the processor is further configured to:
receive a handshake signal from the receiver;
adjust, according to a preset rule, a position of at least one syncword of the preset number of syncwords inserted in a next data frame, wherein the preset rule is that positions of the preset number of syncwords in the next data frame exclude a position of at least one syncword of the preset number of syncwords in the data frame to be sent which is not detected by the receiver, and the next data frame is a data frame arranged behind the data frame to be sent and has a smallest distance from the data frame to be sent; and
send the next data frame to the receiver, wherein the position of the at least one syncword of the preset number of syncwords inserted in the next data frame is adjusted.

10. A receiver, comprising a memory and a processor, wherein the memory is configured to store a program, and the processor is configured to call the program to:
receive a data frame to be sent inserted with a preset number of syncwords from a transmitter; and
perform a cross-correlation process between each syncword of the preset number of syncwords and the data frame to be sent inserted with the preset number of syncwords,
wherein after performing the cross-correlation process between each syncword of the preset number of syncwords and the data frame to be sent inserted with the preset number of syncwords, the processor is further configured to:

determine whether at least two syncwords in the data frame to be sent inserted with the preset number of syncwords are not detected;

send a handshake signal to the transmitter in a case that it is determined at least two syncwords in the data frame to be sent inserted with the preset number of syncwords are not detected; and receive, from the transmitter, a next data frame inserted with the preset number of syncwords, wherein a position of at least one syncword of the preset number of syncwords inserted in the next data frame is adjusted.

* * * * *